United States Patent
Ahn et al.

(10) Patent No.: US 10,373,229 B2
(45) Date of Patent: Aug. 6, 2019

(54) IN-APP RECOMMENDATION SYSTEM AND USER TERMINAL

(75) Inventors: Heejung Ahn, Yongin-si (KR); Suerynn Roh, Seoul (KR); Jihong Lee, Seoul (KR); Hyuckjin Im, Seongnam-si (KR); Jaeseok Jang, Seoul (KR)

(73) Assignee: KT Corporation, Seongnam (KR)

( * ) Notice: Subject to any disclaimer, the term of this patent is extended or adjusted under 35 U.S.C. 154(b) by 864 days.

(21) Appl. No.: 14/126,617

(22) PCT Filed: Jul. 13, 2011

(86) PCT No.: PCT/KR2011/005135
§ 371 (c)(1),
(2), (4) Date: Dec. 16, 2013

(87) PCT Pub. No.: WO2012/173300
PCT Pub. Date: Dec. 20, 2012

(65) Prior Publication Data
US 2014/0143087 A1    May 22, 2014

(30) Foreign Application Priority Data
Jun. 17, 2011 (KR) .................. 10-2011-0059262

(51) Int. Cl.
*G06Q 30/02* (2012.01)
*G06Q 30/06* (2012.01)

(52) U.S. Cl.
CPC ..... *G06Q 30/0631* (2013.01); *G06Q 30/0282* (2013.01)

(58) Field of Classification Search
CPC ................. G06Q 30/0631; G06Q 30/0282
(Continued)

(56) References Cited

U.S. PATENT DOCUMENTS

| 2006/0217111 A1* | 9/2006 | Marolia | G06F 8/65 455/418 |
| 2009/0163183 A1* | 6/2009 | O'Donoghue | G06Q 30/02 455/414.1 |

FOREIGN PATENT DOCUMENTS

| KR | 10-2004-0083603 A | 10/2004 |
| KR | 10-2006-0016975 A | 2/2006 |

(Continued)

OTHER PUBLICATIONS

Costa-Montenegro, Enrique. "Which App? A recommender system of applications in markets: Implementation of the service for monitoring users' interaction." Expert Systems with Applications. (Aug. 2012). vol. 39, Issue 10, pp. 9367-9375. Retrieved from https://doi.org/10.1016/j.eswa.2012.02.131. (Year: 2012).*

(Continued)

*Primary Examiner* — Jason B Dunham
*Assistant Examiner* — Anand R Loharikar
(74) *Attorney, Agent, or Firm* — Sughrue Mion, PLLC

(57) ABSTRACT

An in-app recommending system is provided. The in-app recommending system includes an in-app module interworking unit configured to periodically collect state information of a particular application having an in-app module from a user terminal in which the in-app module is installed, the in-app module being an application in the form of a component which can be inserted into a plurality of unspecified applications to provide a common service, a user analyzing unit configured to generate recommendation information of multimedia content on the basis of the state information of the particular application, the multimedia content including an application and digital content, and a transmission unit configured to push-transmit the recommendation information to the in-app module of the user terminal.

9 Claims, 10 Drawing Sheets

(58) Field of Classification Search
USPC .............................................. 705/26.1–27.2
See application file for complete search history.

(56) References Cited

FOREIGN PATENT DOCUMENTS

| KR | 10-2007-0013389 A | 1/2007 |
| KR | 10-2007-0073109 A | 7/2007 |
| KR | 10-2009-0128730 A | 12/2009 |
| KR | 10-2010-0011807 A | 2/2010 |
| KR | 10-2010-0055712 A | 5/2010 |
| KR | 10-2010-0103286 A | 9/2010 |
| KR | 10-2011-0041342 A | 4/2011 |
| KR | 10-2011-0065970 A | 6/2011 |

OTHER PUBLICATIONS

International Search Report for PCT/KR2011/005135 dated May 17, 2012.

* cited by examiner

IN-APP RECOMMENDATION SYSTEM AND USER TERMINAL

CROSS-REFERENCE TO RELATED PATENT APPLICATION

This application is a National Stage of International Application No. PCT/KR2011/005135 filed on Jul. 13, 2011, and claims the benefit of Korean Patent Application No. 10-2011-0059262 filed on Jun. 17, 2011, in the Korean Intellectual Property Office, the disclosures of which are incorporated herein in their entirety by reference.

BACKGROUND OF THE INVENTION

1. Field of the Invention

The exemplary embodiments relate to an in-app recommending system and a user terminal.

2. Description of the Related Art

Smartphones that have been actively developed and released provide various applications. Also, various multimedia content and applications may be purchased through an online market such as an app store.

However, in the related art, when a user finds interesting multimedia content while watching a TV or while Web surfing, the user needs to directly connect to an online market, search for the multimedia content, and subsequently purchase it, causing inconvenience.

Also, the user may download the purchased content to his or her phone, but a function allowing for the user to present content to a different user, in particular, a friend, or to download content to another of his or her terminals is not provided.

Further, a function allowing the user to share multimedia content with a different user, while executing the multimedia content, has not been proposed yet.

The above information disclosed in this Background section is only for enhancement of understanding of the background of the invention and therefore it may contain information that does not form the prior art that is already known in this country to a person of ordinary skill in the art.

SUMMARY OF THE INVENTION

The exemplary embodiments have been made in an effort to provide an in-app recommending system and a user terminal that provide an in-app service allowing for recommending a customized application and allowing for users to present, recommend, and share an application through an in-app module.

An exemplary embodiment provides an in-app recommending system. The in-app recommending system includes: an in-app module interworking unit configured to periodically collect state information of a particular application having an in-app module from a user terminal in which the in-app module is installed, the in-app module being an application in the form of a component which can be inserted into a plurality of unspecified applications to provide a common service; a user analyzing unit configured to generate recommendation information of multimedia content on the basis of the state information of the particular application, the multimedia content including an application and digital content; and a transmission unit configured to push-transmit the recommendation information to the in-app module of the user terminal.

Another exemplary embodiment provides a user terminal. The user terminal includes: an in-app module configured as an application in the form of a component which can be inserted into a plurality of unspecified applications to provide a common service, installed in a particular application installed in the user terminal, configured to periodically transmit state information of the particular application to an in-app recommending system, receive multimedia content recommendation information generated by the in-app recommending system, and transmit, when user confirmation with respect to the multimedia content recommendation information is input, the user confirmation to the in-app recommending system; and a download unit configured to download multimedia content included in the recommendation information from the in-app recommending system.

According to an exemplary embodiment, since an in-app service is implemented in the form of a component and inserted in a plurality of unspecified applications, a customized recommended service can be easily provided in any environment.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Figure 1:
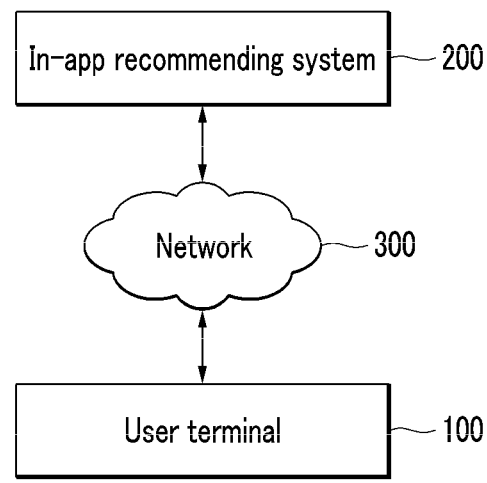
FIG. 1 is a view illustrating a configuration of an in-app service network according to an exemplary embodiment.

In the following detailed description, only certain exemplary embodiments have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms such as "-er", "-or", and "module" described in the specification mean units for processing at least one function and operation and can be implemented by hardware components or software components and combinations thereof.

Hereinafter, an in-app recommending system and a user terminal according to an exemplary embodiment will be described in detail.

First, in-app refers to an application in the form of a component which can be inserted into a plurality of unspecified applications to provide a common service.

Here, an application may be a web application accessed by a uniform resource locator (URL) of a web page and executed on the web, or may be a native application downloaded to a terminal and executed in the terminal.

FIG. 1 is a view illustrating a configuration of an in-app service network according to an exemplary embodiment.

Figure 2:
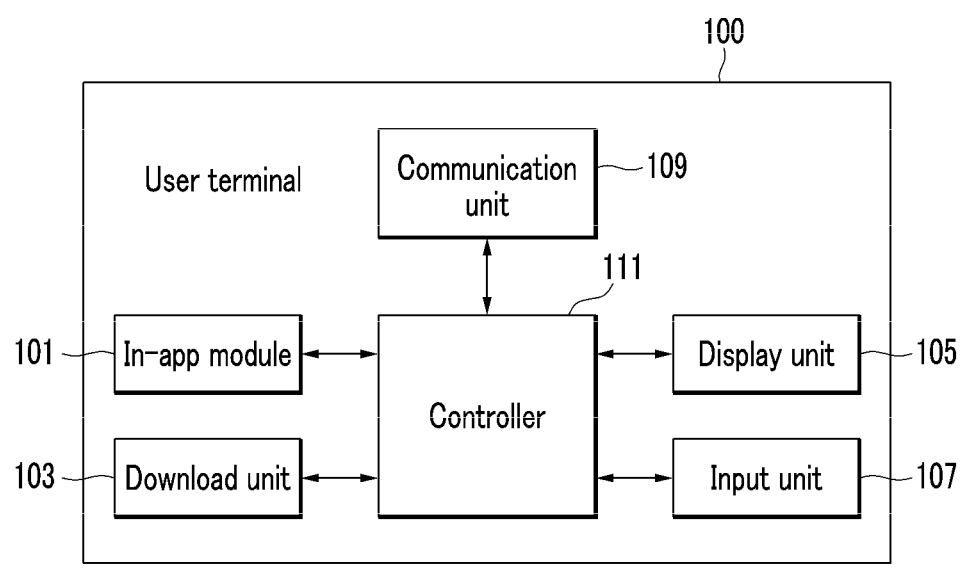
FIG. 2 is a block diagram illustrating a configuration of a user terminal according to an exemplary embodiment.

Referring to FIGS. 1 and 2, the in-app service network includes a user terminal 100 and an in-app recommending system 200. The user terminal 100 and the in-app recommending system 200 are connected via a network 300.

The network 300 provides an access path allowing the user terminal 100 to access the in-app system 200. When the user terminal 100 is a wired terminal, the network 300 may be a wired communication network such as the Internet, and when the user terminal 100 is a mobile terminal, the network 300 may be a wireless communication network such as a mobile communication network.

The user terminal 100 may include any terminal which may access the network 300 to transmit and receive data and store and execute digital content. The user terminal 100 may include any terminal which includes an in-app module 101 installed therein and is able to access the network 300.

The in-app recommending system 200 interworks or communicates with the in-app module 101 installed in the user terminal 100 to generate customized recommended information on the basis of state information of a particular application, e.g., a first application, having the in-app module 101 installed therein, and provides the same.

The recommended information includes a recommended application and recommended digital content.

Detailed configurations of the user terminal 100 and the in-app recommending system 200 will now be described.

FIG. 2 is a block diagram illustrating a configuration of a user terminal according to an exemplary embodiment.

Referring to FIG. 2, the user terminal 100 includes the in-app module 101, a download unit 103, a display unit 105, an input unit 107, a communication unit 109, and a controller 111.

The in-app module 101 is illustrated as a separate component, but is a component installed in a particular application. In this case, the in-app module 101 is provided in the form of an open API to application developers so as to be installed.

The in-app module 101 refers to an application in the form of a component which can be inserted into a plurality of unspecified applications to provide a common service. The in-app module 101 periodically transmits state information of a particular application in which the in-app module 101 is installed, to the in-app recommending system 200. On the basis of state information from the in-app recommending system 200, the in-app module 101 receives multimedia content recommendation information generated by the in-app recommending system 200, and when user confirmation with respect to the multimedia content recommendation information is received, the in-app module 101 transmits the user confirmation. In an exemplary embodiment, multimedia content is defined as including an application and digital content.

While a particular application is being executed, the in-app module 101 outputs a recommended item, a gift item, and a share item of the particular application to a screen, and when one of the items is selected, the in-app module 101 transmits a request for the corresponding item of the particular application to the in-app recommending system 200.

In a case in which the particular application provides a social service, when a particular friend, i.e., a first friend, is selected from a friend list of a subscriber of the user terminal, the in-app module 101 transmits information regarding a terminal of the particular friend and the request for the corresponding item.

The download unit 103 downloads multimedia content included in the recommended information from the in-app recommending system 200.

The display unit 105 outputs various types of information according to an operation of the user terminal 100 to the screen.

The input unit 107 is a means for allowing the user to input information or select information displayed on the display unit 130.

The communication unit 109 is connected to the network 200 to provide a path for transmitting and receiving data.

The controller 111 is to a component which performs a general operation of the user terminal 100 according to an operating system of the user terminal 100, and is connected to the in-app module 101, the download unit 103, the display unit 105, the input unit 107, and the communication unit 109 to control associated operations between the respective components.

Figure 3:
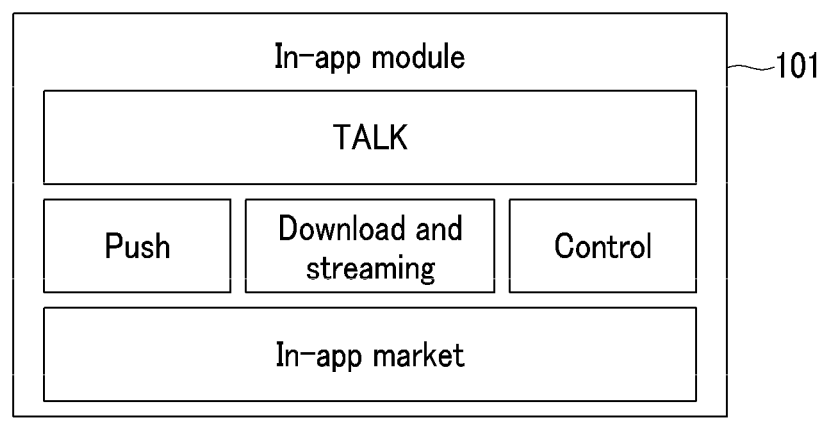
FIG. 3 is a functional block diagram of an in-app module according to an exemplary embodiment.

FIG. 3 is a functional block diagram of the in-app module according to an exemplary embodiment.

Referring to FIG. 3, the in-app module 101 includes a 'TALK' function, a 'push' function, a 'download and streaming' function, a 'control' function, and an 'in-app market'.

Here, the 'TALK' function provides a communication function between user terminals 100 having the in-app module 101 installed therein. According to the function, an environment in which a counterpart terminal having the in-app module 101 is registered by using an ID or a phone number may be provided.

The 'push' function pushes multimedia content stored in the user terminal 100 having the in-app module 101 installed therein to a different user terminal 100 having an in-app module 101 installed therein.

The 'download and streaming' function may download and stream multimedia content from the in-app recommending system 200.

The 'control' function controls an in-app service of the in-app module 120, and it may confirm authority to execute multimedia content.

The 'in-app market' function may be connected to the in-app recommending system 200 to provide an interface environment allowing for purchasing multimedia content.

Figure 4:
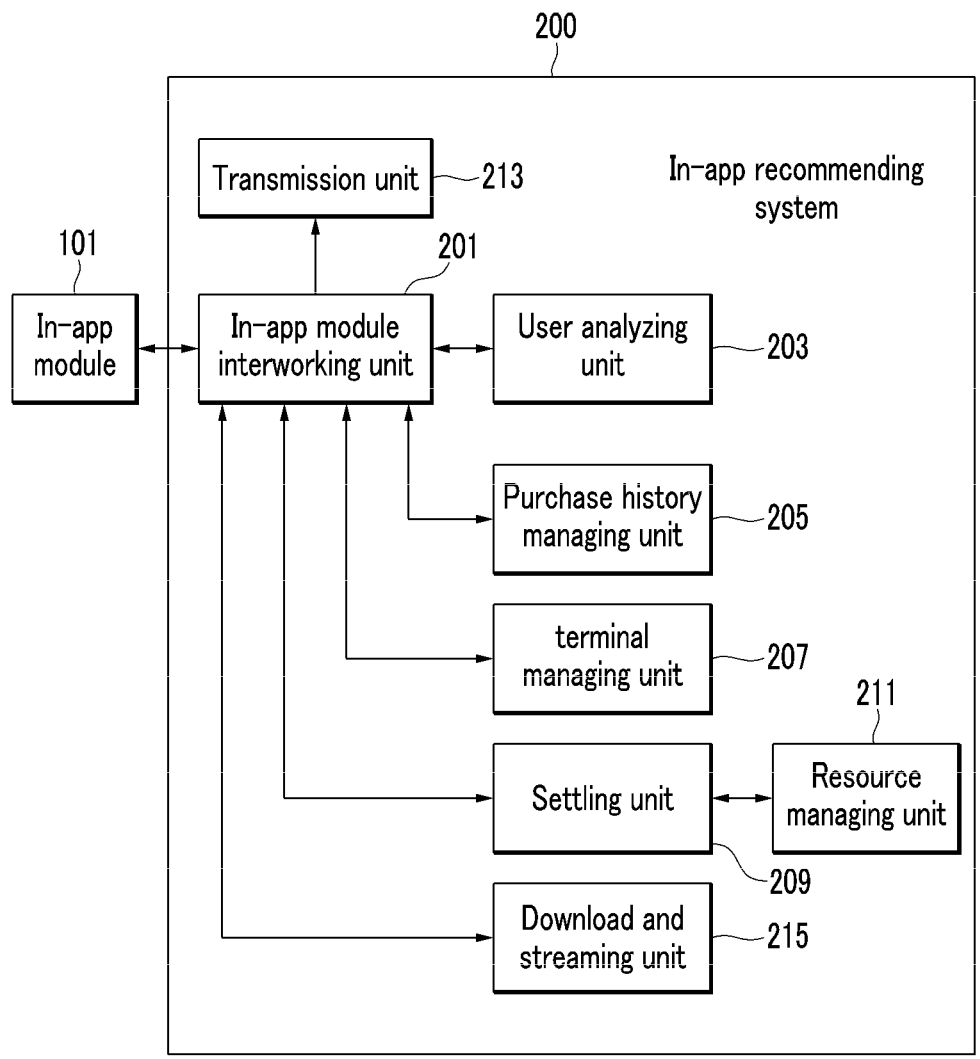
FIG. 4 is a block diagram illustrating a configuration of an in-app recommending system according to an exemplary embodiment.

FIG. 4 is a block diagram illustrating a configuration of the in-app recommending system according to an exemplary embodiment.

Referring to FIG. 4, the in-app recommending system 200 includes an in-app module interworking unit 201, e.g, in-app module interworker, a user analyzing unit 203, e.g., a user analyzer, a purchase history managing unit 205, e.g., a purchase history manager, a terminal managing unit 207, e.g., a terminal manager, a settling unit 209, e.g., a settler, a resource managing unit 211, e.g., a resource manager, a transmission unit 213, e.g., a transmitter, and a download and streaming unit 215, e.g., a downloader and streamer.

The in-app module interworking unit 201 periodically collects state information of a particular application including the in-app module 101 installed therein from the in-app module 101.

The user analyzing unit 203 generates information regarding recommendation of multimedia content on the basis of the state information of the particular application. The multimedia content includes an application and digital content.

The recommendation information is generated in consideration of purchase history of the subscriber of the user terminal.

The user analyzing unit 203 selects a subscriber preference terminal on the basis of the purchase history among terminals owned by the subscriber of the user terminal 100, and generates recommendation information that may be used by the subscriber preference terminal.

The user analyzing unit 203 also transmits a user interface page configured to select a terminal to the user terminal 100. Information regarding a terminal selected by the user is received from the user terminal 100. Recommendation information executable in the terminal selected by the user is generated.

Also, the user analyzing unit 203 pushes a recommendation message including the recommendation information to the user terminal 100, and when a confirmation request is received from the user terminal, the user analyzing unit 203 requests transmission of recommendation content.

The recommendation message includes an experience version download item for downloading multimedia content to use it free of charge, e.g., a trial version or a free version, and a paid version download item for purchasing multimedia content to use it.

Thus, when the user selects the experience version download item and a confirmation request is received, the user analyzing unit 203 transmits experience version multimedia content to the user terminal. In a case in which the user selects a paid version download item and a confirmation request is received, when purchasing of multimedia content is completed, the user analyzing unit 203 may request transmission of multimedia content to the user terminal.

The experience version multimedia content includes multimedia content having limited usage term or a portion of multimedia content.

Also, when the recommendation request is received, the user analyzing unit 203 checks purchase history of a counterpart terminal as a recommendation target to determine whether a particular application having an in-app module of a user terminal installed therein has been purchased. When the particular application has not been purchased, the user analyzing unit 203 transmits a terminal selection user interface page including a terminal list of a subscriber of a counterpart terminal to the counterpart terminal to generate a particular application as a recommendation application such that it may be executed in a terminal selected by the counterpart subscriber.

When a present request is received, the user analyzing unit 203 checks terminal information and purchase history of the subscriber of the counterpart terminal as a present request target to determine whether a particular application having the in-app module 101 installed therein has been purchased. In a case in which the particular application has not been purchased, the user analyzing unit 203 determines whether the particular application is executable in the counterpart terminal. When the particular application is executable, the user analyzing unit 203 requests to push and transmit the paid particular application to the counterpart terminal.

When a share request is received, the user analyzing unit 203 checks terminal information and purchase history of the subscriber of the counterpart terminal as a share request target to determine whether a particular application having the in-app module 101 installed therein has been purchased. In a case in which the particular application has not been purchased, the user analyzing unit 203 determines whether the particular application is executable in the counterpart terminal. When the particular application is executable, the user analyzing unit 203 push-transmits a message recommending an experience version of the particular application to the counterpart terminal, and when acceptance of the experience version recommendation is received from the counterpart terminal, the user analyzing unit 203 provides the particular application of the experience version to the counterpart terminal.

The purchase history managing unit 205 manages purchase history of multimedia content by subscribers.

The terminal managing unit 207 manages a terminal list including terminals owned by each subscriber, and searches terminal information of the subscriber of the user terminal 100.

When paid version confirmation is received from the user terminal, the settling unit 209 checks whether integrated payment resource information of the subscriber of the user terminal exists. When integrated payment resource information exists, the settling unit 209 pays for the recommendation multimedia content by using the integrated payment resource information. When integrated payment resource information does not exist, the settling unit 209 receives payment information, registers it as integrated payment resource information, and pays for it.

The resource managing unit 211 manages integrated payment resource information by subscribers, and provides the same to the settling unit 209.

The transmission unit 213 push-transmits the recommendation information generated by the user analyzing unit 203 to the in-app module 101.

The download and streaming unit 215 transmits multimedia content, namely, a recommendation app, a present app, a share app, and the like, requested by the user terminal 100, to the user terminal 100.

Various exemplary embodiments of the in-app recommending method will be described on the basis of the foregoing contents. The in-app recommending method will be described in association with the configurations of FIGS. 1 through 4, and the same reference numerals are used for the same components.

Figure 5:
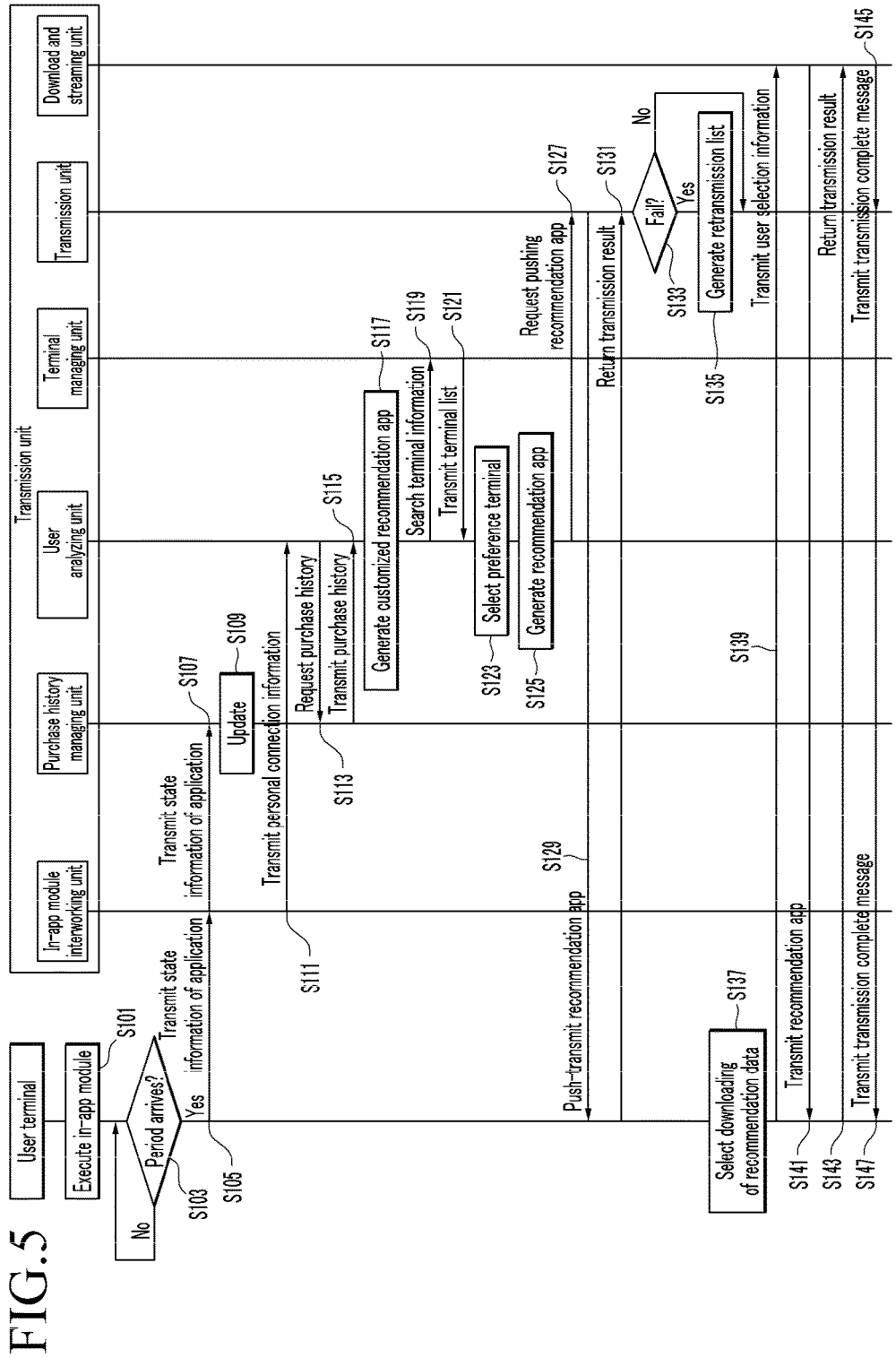
FIG. 5 is a flowchart illustrating a process of an in-app recommending method according to an exemplary embodiment.

FIG. 5 is a flowchart illustrating a process of an in-app recommending method according to an exemplary embodiment.

Referring to FIG. 5, the in-app module 101 is executed in the user terminal 100 (S101). When a period arrives (S103), the in-app module 101 transmits state information of a particular application having the in-app module 101 installed therein (S105). The state information may include purchase information of the particular application, purchase history of the subscriber through the particular application, and the like.

Then, the in-app module interworking unit 201 of the in-app recommending system 200 receives the state information and delivers the same to the purchase history managing unit 205 (S107). The purchase history managing unit 205 then updates the received state information in a purchase history DB (not shown) of each subscriber (S109).

Thereafter, the in-app module interworking unit 201 transmits personal connection information of the in-app module 101 to the user analyzing unit 203 (S111).

Subsequently, the user analyzing unit 203 requests purchase history from the purchase history managing unit 205 (S113) and receives the same (S115). The user analyzing unit 203 generates a customized recommendation app and recommendation content (S117).

Also, the user analyzing unit 203 requests the terminal managing unit 207 to search terminal information of the subscriber of the user terminal and receives the same (S119 and S121). The user analyzing unit 203 selects a preference terminal of the subscriber of the user terminal on the basis of the purchase history received in operation S115 (S123), and generates a recommendation app or recommendation content that may be executable in the preference terminal (S125). The purchase history includes purchase details through a terminal owned by the subscriber.

Then, the user analyzing unit 203 requests the transmission unit 213 to push the information including information regarding the generated recommendation app (S127). The transmission unit 213 transmits requested recommendation information to the user terminal 100 (S129). The recommendation information may be implemented as a message. The recommendation message may be implemented as "Recommendation app arrived→paid version download→'experience version download'".

The user terminal 100 then returns the transmission result (S131).

In this case, the transmission unit 213 checks failure on the basis of the transmission result (S133), and in case of failure, the transmission unit 213 generates a retransmission list for retransmission afterwards (S135).

Thereafter, when downloading of recommendation information is selected (S137), the user terminal 100 transmits user selected information to the download and streaming unit 215 (S139) to receive content included in the recommendation information, namely, a recommended app or content (S141).

When the user terminal 100 returns the transmission result (S143), a transmission complete message is received (S145, S147).

Figure 6:
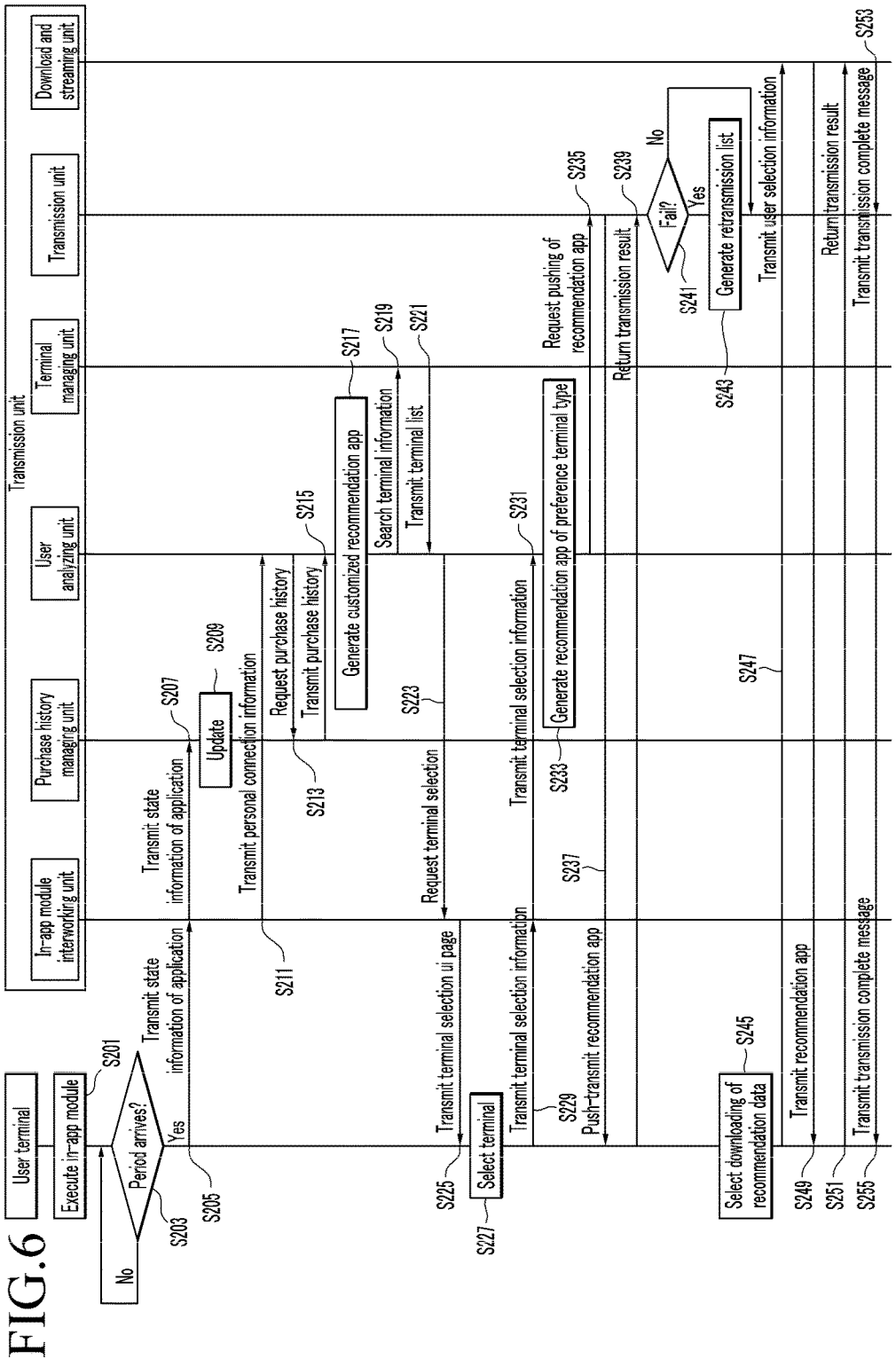
FIG. 6 is a flowchart illustrating a process of an in-app recommending method according to another exemplary embodiment.

FIG. 6 is a flowchart illustrating a process of an in-app recommending method according to another exemplary embodiment.

Referring to FIG. 6, the in-app module 101 is executed in the user terminal 100 (S201). When a period arrives (S203), the in-app module 101 transmits state information of a particular application having the in-app module 101 installed therein (S205).

Then, the in-app module interworking unit 201 of the in-app recommending system 200 receives the state information and delivers the same to the purchase history managing unit 205 (S207). The purchase history managing unit 205 then updates the received state information in a purchase history DB (not shown) of each subscriber (S209).

Thereafter, the in-app module interworking unit 201 transmits personal connection information of the in-app module 101 to the user analyzing unit 203 (S211).

The user analyzing unit 203 then requests purchase history from the purchase history managing unit 205 (S213) and receives the same (S215). The user analyzing unit 203 generates a customized recommendation app and recommendation content (S217).

The user analyzing unit 203 requests the terminal managing unit 207 to search terminal information of the subscriber of the user terminal and receives the same (S219 and S221). The user analyzing unit 203 requests the in-app module interworking unit 201 to select a terminal (S223).

The in-app module interworking unit 201 transmits a user interface (UI) allowing for selecting a terminal to the user terminal 100 (S225). Here, although not shown, the in-app module interworking unit 201 interworks with a UI server that provides a UI page and receives information selected by the user from the UI page.

In this case, the UI page may be implemented as "Please select terminal for receiving recommendation app based on social used by Mr. or Miss OOO→mobile phone→pad".

When the user selects a terminal (S227), the user terminal 100 transmits terminal selection information to the in-app module interworking unit 201 (S229). Then, the in-app module interworking unit 201 delivers the terminal selection information to the user analyzing unit 203 (S231).

The user analyzing unit 203 generates recommendation app or recommendation content executable in the user selected terminal (S233).

The user analyzing unit 203 then requests the transmission unit 213 to push information including information regarding the generated recommendation app (S235). The transmission unit 213 transmits the requested recommendation information to the user terminal 100 (S237). The user terminal 100 returns the transmission result (S239).

Here, the transmission unit 213 checks failure on the basis of the transmission result (S241), and in case of failure, the transmission unit 213 generates a retransmission list for retransmission afterwards (S243).

Thereafter, when downloading of recommendation information is selected (S245), the user terminal 100 transmits user selected information to the download and streaming unit 215 (S247) to receive content included in the recommendation information, namely, a recommended app or content (S249).

When the user terminal 100 returns the transmission result (S251), a transmission complete message is received (S253, S255).

Figure 7:
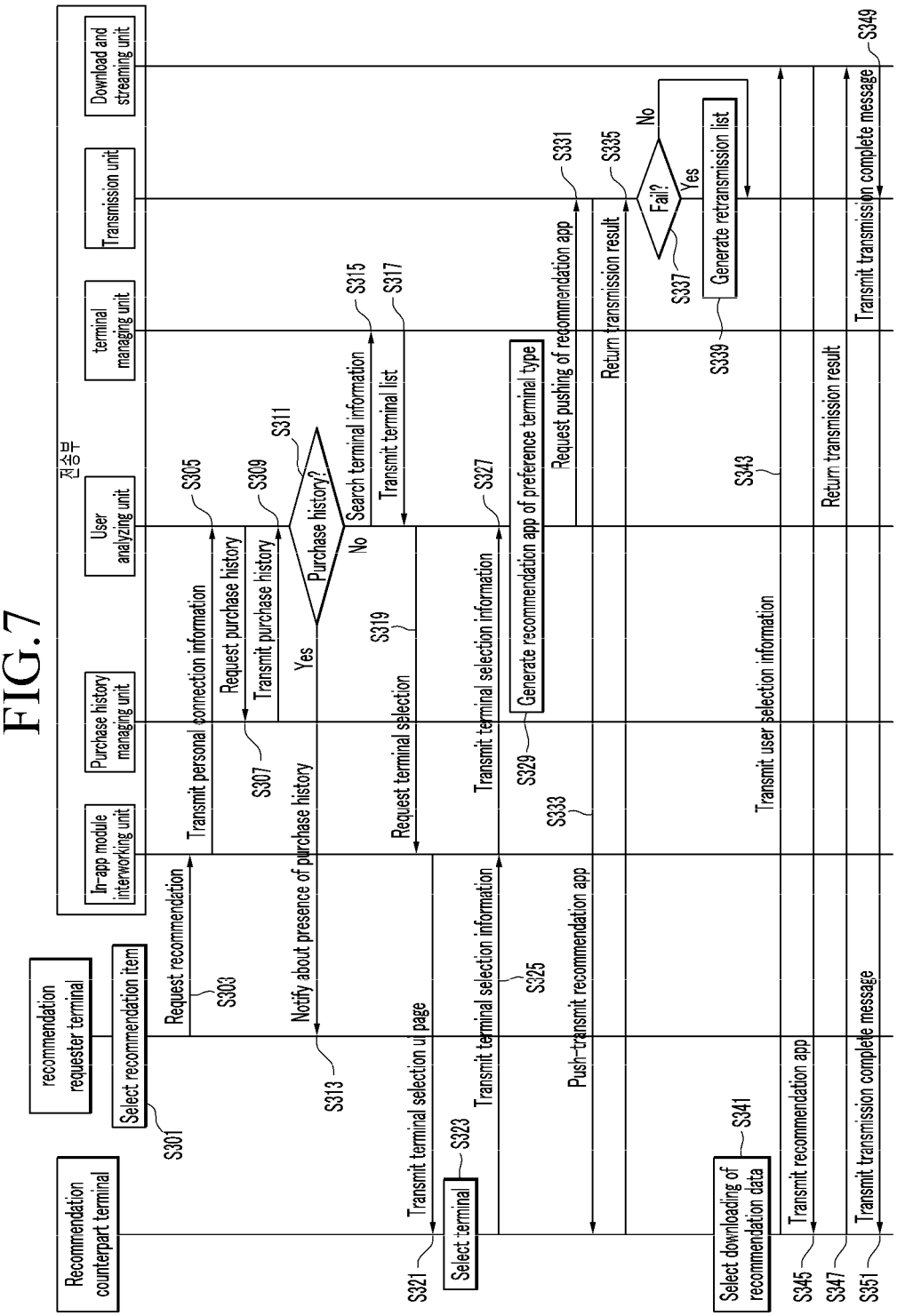
FIG. 7 is a flowchart illustrating a process of an in-app recommending method according to another exemplary embodiment.

FIG. 7 is a flowchart illustrating a process of an in-app recommending method according to another exemplary embodiment.

Referring to FIG. 7, when the recommendation requester terminal 100 selects a recommendation item in a state in which the user executes the particular application (S301), the recommendation requester terminal 100 transmits a recommendation request to the in-app module interworking unit 201 (S303).

Then, the in-app module interworking unit 201 transmits personal connection information of the in-app module 101 to the user analyzing unit 203 (S305).

The user analyzing unit 203 requests purchase history from the purchase history managing unit 205 (S307) and receives the same (S309).

Here, the user analyzing unit 203 determines whether there is purchase history (S311), and when purchase history exists, the user analyzing unit 203 transmits purchase history presence notification to the user terminal 100 (S313). Meanwhile, when purchase history does not exist, the user analyzing unit 203 requests the terminal managing unit 207 to search terminal information of the user terminal subscriber and receives (S315, S317).

The user analyzing unit 203 requests the in-app module interworking unit 201 to select a terminal (S319).

The in-app module interworking unit 201 transmits a user interface (UI) for selecting a terminal to the user terminal 100 (S321).

When the user selects a terminal (S323), the user terminal 100 transmits terminal selection information to the in-app module interworking unit 201 (S325). Then, the in-app module interworking unit 201 delivers the terminal selection information to the user analyzing unit 203 (S327).

The user analyzing unit 203 generates a recommendation app or recommendation content executable in the user selected terminal (S329).

The user analyzing unit 203 requests the transmission unit 213 to push the information including information of the generated recommendation app (S331). The transmission unit 213 transmits the requested recommendation information to the user terminal 100 (S333). The user terminal 100 returns the transmission result (S335).

At this time, the transmission unit 213 checks failures on the basis of the transmission result (S337). In case of failure, the transmission unit 213 generates a retransmission list for retransmission afterwards (S339).

Thereafter, when downloading of the recommendation information is selected, the user terminal 100 transmits the user selection information to the download and streaming unit 215 (S343) to receive content included in the recommendation information, i.e., a recommendation app or content (S345).

When the user terminal 100 returns the transmission result (S347), a transmission complete message is received (S349, S351).

Figure 8:
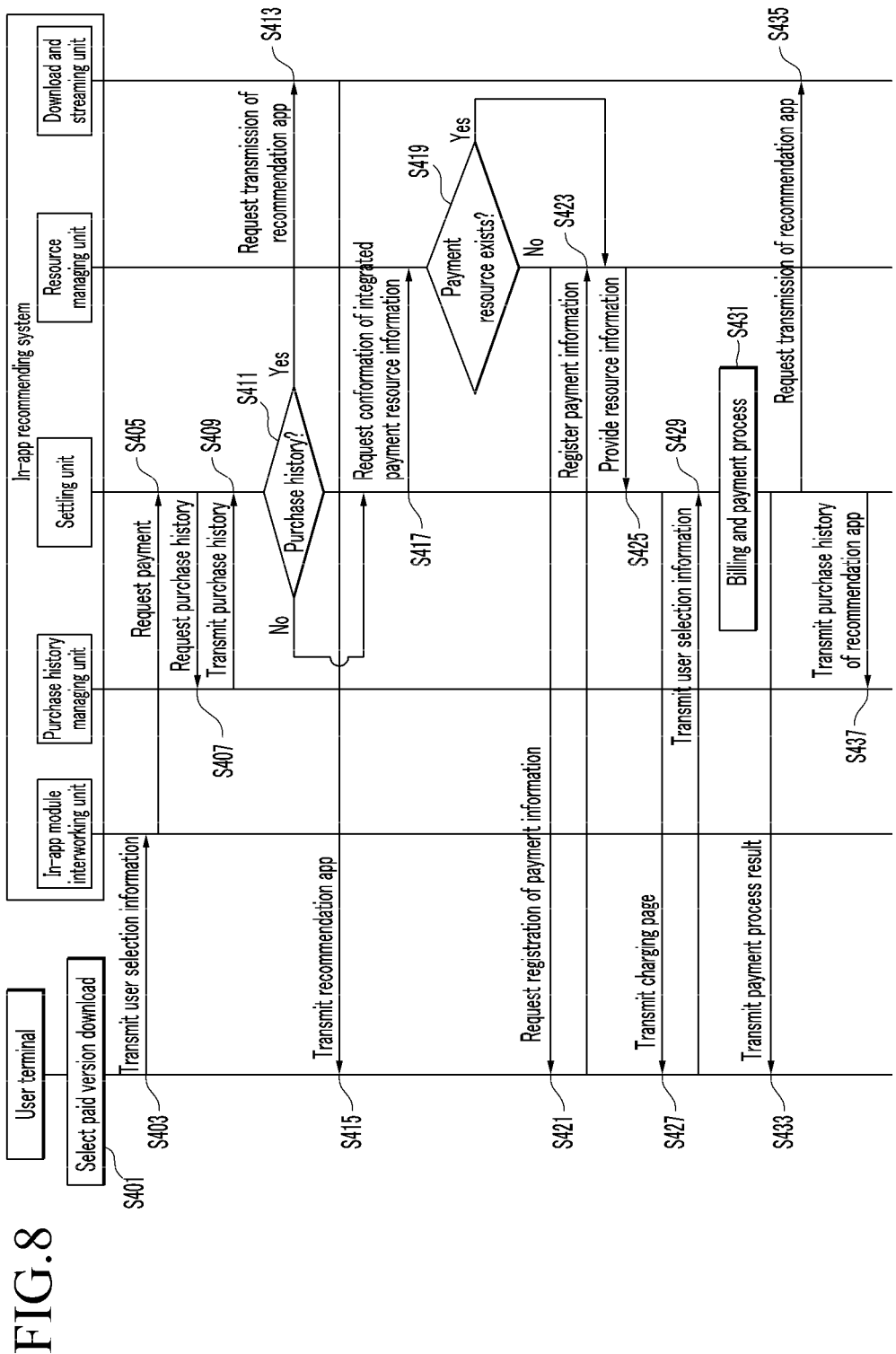
FIG. 8 is a flowchart illustrating a purchase process according to an exemplary embodiment.

FIG. 8 is a flowchart illustrating a purchase process according to an exemplary embodiment. The process of FIG. 8 may be performed in all the processes of FIGS. 5 through 10.

Referring to FIG. 8, when the user selects paid version download (S401), the user terminal 100 transmits user selection information to the in-app module interworking unit 201 (S403).

The in-app module interworking unit 201 requests payment from the settling unit 209 (S409).

The settling unit 209 requests purchase history from the purchase history managing unit 205 (S407) and receives the same (S409).

The settling unit 209 determines whether there is purchase history (S411), and when purchase history exists, the settling unit 209 requests transmission of a recommendation app of paid version from the download and streaming unit 215 (S413). Then, the download and streaming unit 215 transmits the recommendation app to the user terminal 100 (S415).

Meanwhile, when purchase history does not exist, the settling unit 209 requests the resource managing unit 211 to check integrated payment resource information (S417). Here, the integrated payment resource information is defined as payment information registered to be paid in a terminal in which the in-app module 101 is installed, regardless of the type of terminal.

The resource managing unit 211 determines whether a payment resource exists (S419). When the payment resource does not exist, the resource managing unit 211 requests payment information registration from the user terminal 100 to perform registration (S421, S423).

When payment resource exists or after registration is performed, the resource managing unit 211 provides the payment resource information requested in operation S417 to the settling unit 209 (S425). The payment resource information includes information required for payment such as mobile payment, credit card payment, or the like.

The settling unit 209 then transmits a charging page including charging information of the recommendation app to the user terminal 100 (S427). When the user agrees with the charging page, the settling unit 209 receives user selection information (S329).

Then, the settling unit 209 performs the charging and payment process (S431), and transmits payment results to the user terminal 100 (S433). The settling unit 209 requests transmission of the recommendation app from the download and streaming unit 215 (S435). The settling unit 209 transmits purchase history of the recommendation app to the purchase history managing unit 205 (S437).

Figure 9:
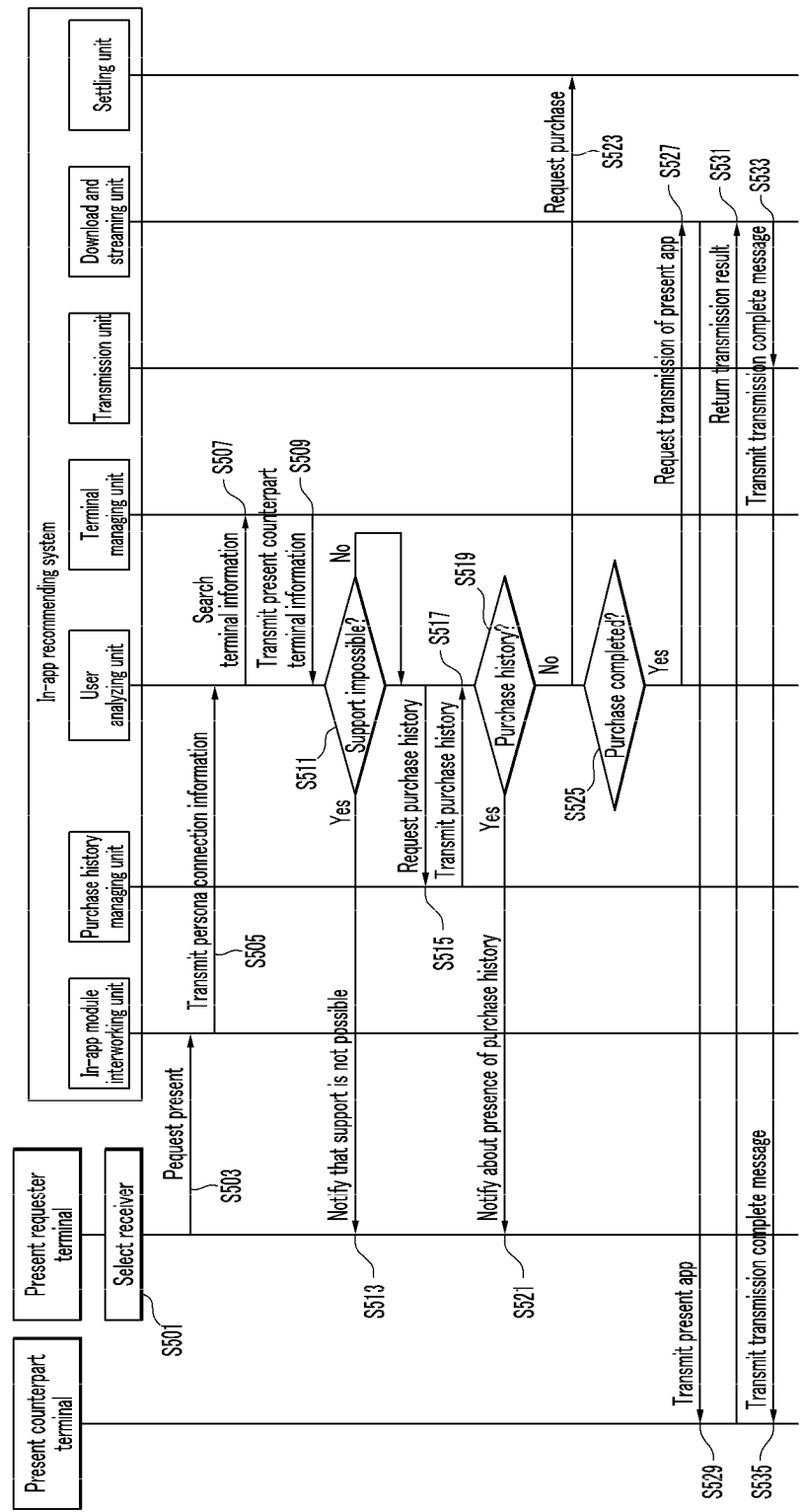
FIG. 9 is a flowchart illustrating an in-app presenting method according to an exemplary embodiment.

FIG. 9 is a flowchart illustrating an in-app presenting method according to an exemplary embodiment.

Referring to FIG. 9, when the user selects a receiver (S501) and requests a present, the user terminal 100 transmits the present request to the in-app module interworking unit 201 (S503). In this case, when a present item is selected in a state in which a particular application is executed, the in-app module 101 may request presenting of the particular application.

The in-app module interworking unit 201 then transmits personal connection information to the user analyzing unit 203 (S505).

The user analyzing unit 203 requests the terminal managing unit 207 to search terminal information (S507) and receives terminal information of a present counterpart (S509).

In this case, the user analyzing unit 203 determines whether the user requested app is executable in the counterpart terminal (S511). When the counterpart terminal cannot support the user requested app, the user analyzing unit 203 transmits a support unavailability notification to the present requester terminal 100 (S513). For example, the user analyzing unit 203 may transmit a message "Receiver terminal does not support corresponding app".

Meanwhile, when the counterpart terminal supports the user requested app, the user analyzing unit 203 requests purchase history from the purchase history managing unit 205 to receive it (S515, S517). The present counterpart also includes the in-app module 101, and uploads state information of a particular application having the in-app module 101 installed therein to the purchase history managing unit 205 periodically.

Meanwhile, the user analyzing unit 203 determines whether purchase history exists (S519). When purchase history exists, the user analyzing unit 203 transmits a notification indicating that the counterpart terminal has purchase history to the present requester terminal 100 (S521). For example, the user analyzing unit 203 may transmit a message "Receiver has already purchased the corresponding app".

Meanwhile, in a case in which purchase history does not exist, the user analyzing unit 203 requests purchase from the settling unit 209 (S523) to allow for performing the process of FIG. 8, and here, corresponding operations are omitted.

Thereafter, when purchase is completed (S525), the user analyzing unit 203 requests transmission of a recommendation app from the download and streaming unit 216 (S527). Then, the download and streaming unit 215 transmits the recommendation app to the present counterpart terminal 100 (S529).

The user terminal 100 then returns the transmission result (S531) and receives a transmission complete message (S533, S535).

Figure 10:
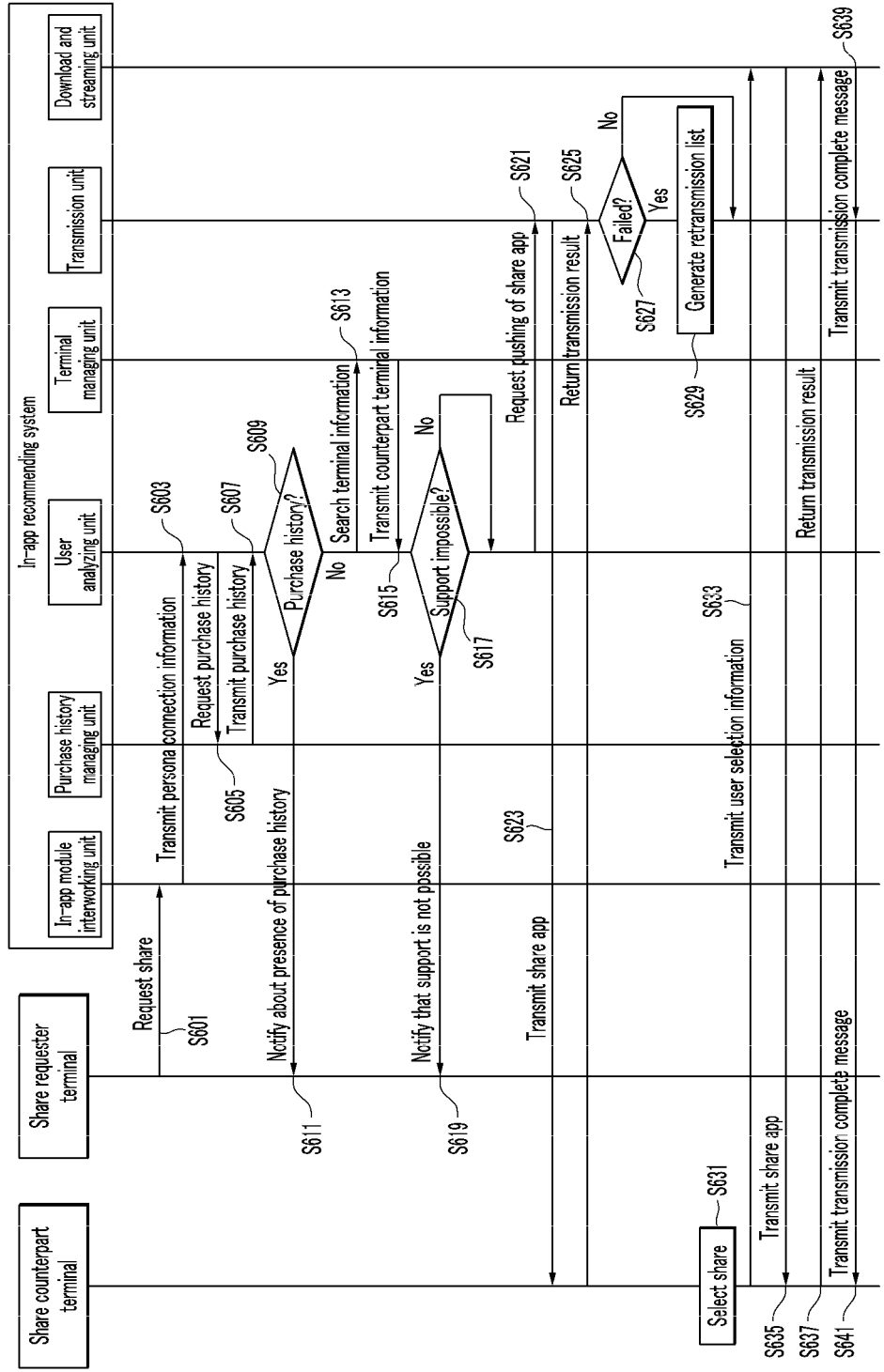
FIG. 10 is a flowchart illustrating an in-app sharing method according to an exemplary embodiment.

FIG. 10 is a flowchart illustrating an in-app sharing method according to an exemplary embodiment.

Referring to FIG. 10, when the user selects a receiver and requests sharing, the user terminal 100 transmits the share request to the in-app module interworking unit 201 (S601). In this case, when a share item is selected in a state in which a particular application is executed, the in-app module 101 may request sharing of the particular application.

Then, the in-app module interworking unit 201 transmits personal connection information to the user analyzing unit 203 (S603).

The user analyzing unit 203 then requests purchase history from the purchase history managing unit 205 to receive it (S605, S607). The share counterpart also includes the in-app module 101, and periodically uploads state information of a particular application having the in-app module 101 installed therein to the purchase history managing unit 205.

Meanwhile, the user analyzing unit 203 determines whether purchase history exists (S609). When purchase history exists, the user analyzing unit 203 transmits a notification indicating that the counterpart terminal has purchase history to the share requester terminal 100 (S611). For example, the user analyzing unit 203 may transmit a message "Receiver has already purchased the corresponding app".

Meanwhile, when there is no purchase history, the user analyzing unit 203 requests the terminal managing unit 207 to search terminal information and receives terminal information of the share counterpart (S615).

In this case, the user analyzing unit 203 determines whether the app requested by the user to share is executable in the counterpart terminal (S617). When the counterpart terminal cannot support the user requested app, the user analyzing unit 203 transmits a support unavailability notification to the share requester terminal 100 (S619). For example, the user analyzing unit 203 may transmit a message "Share target terminal does not support corresponding app".

When the counterpart terminal supports the user requested app, the user analyzing unit 203 requests the transmission unit 213 to push recommendation information including information regarding an app requested to be shared (S621). The transmission unit 213 transmits the requested recommendation information to the share target terminal 100 (S623). Then, the share target terminal 100 returns the transmission result (S625).

In this case, the transmission unit 213 checks failure on the basis of the transmission result (S627), and in case of failure, the transmission unit 213 generates a retransmission list for retransmission afterwards (S629).

Thereafter, when the user selects downloading of the experience version of the recommendation information (S631), the share target terminal 100 transmits user selection information to the download and streaming unit 215 (S633) to receive share app (S635).

When the share target terminal 100 returns the transmission result (S637), it receives a transmission complete message (S639, S641).

Figure 11:
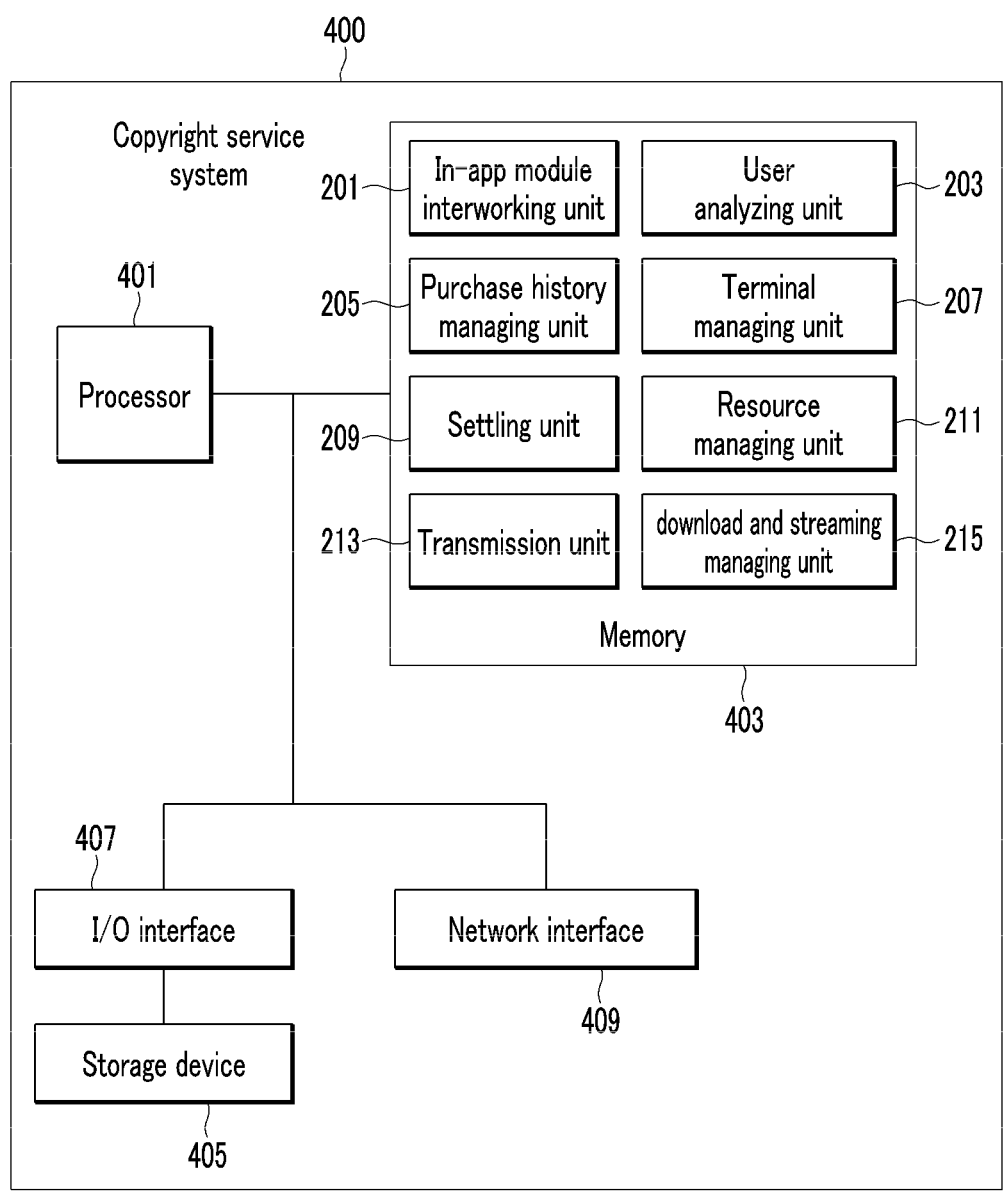
FIG. 11 is a schematic view of an in-app recommending system according to another exemplary embodiment.

FIG. 11 is a schematic view of an in-app recommending system according to another exemplary embodiment.

At least some functions of the in-app recommending system 200 according to an exemplary embodiment may be implemented as hardware or software combined with hardware.

An exemplary embodiment in which the in-app recommending system 200 is combined to a computer system will be described in detail with reference to FIG. 11.

FIG. 11 is a schematic view of an in-app recommending system according to another exemplary embodiment. The in-app recommending system may be used to perform at least some of the functions of the in-app module interworking unit 201, the user analyzing unit 203, the purchase history managing unit 205, the terminal managing unit 207, the settling unit 209, the resource managing unit 211, the transmission unit 213, and the download and streaming unit 215 as described above with reference to FIG. 4.

Referring to FIG. 11, the in-app recommending system 400 includes a processor 401, a memory 403, at least one storage device 405, an input/output (I/O) interface 407, and a network interface 409.

The processor 401 may be implemented as a central processing unit (CPU), a chip set, a microprocessor, or the like, and the memory 403 may be implemented as a medium such as a random access memory (RAM) such as a dynamic RAM (DRAM), a rambus DRAM, a synchronous DRAM (SDRAM), a static RAM (SRAM), or the like.

The storage device 405 may be implemented as a permanent or volatile storage device such as a hard disk, a compact disk read only memory (CD-ROM), a CD rewritable (CD-RW), a digital video disk (DVD)-ROM, a flash memory, or various types of RAM.

The I/O interface 407 allows the processor 401 and/or memory 403 to access the storage device 405, and the network interface 409 allows the processor 401 and/or the memory 403 to access the network 300.

In this case, the processor 401 may load a program command for implementing at least some of the functions of the in-app module interworking unit 201, the user analyzing unit 203, the purchase history managing unit 205, the terminal managing unit 207, the settling unit 209, the resource managing unit 211, the transmission unit 213, and the download and streaming unit 215 to the memory 403, and provide control to perform the operations as described above with reference to FIG. 3.

Also, the storage device 405 may interwork with the processor 401 to perform a function.

The processor 401, the memory 403, the storage device 405, the I/O interface unit 407, and the network interface 409 illustrated in FIG. 10 may be implemented in a single computer or may be implemented in a plurality of computers in a distributed fashion.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

The invention claimed is:

1. A system for identifying a counterpart terminal and delivering a particular application to the counterpart terminal, the system comprising:
   a user-interface (UI) server, wherein the UI server is configured to:
      provide a UI page to a user terminal, wherein the UI page indicates a first device of a different user and a second device of the different user, and
      receive a first selection of the first device from a user, wherein the user is associated with the user terminal; and an in-app recommending system, coupled to the UI server, the in-app recommending system comprising:
  a processor;
  an in-app module interworker which is implemented by the processor and which is configured to:
    receive, from the UI server, the first selection, and periodically collect state information of a first application having an in-app module, from the user terminal, wherein the in-app module is installed in the user terminal, the in-app module being an application in a form of a component which can be inserted into a plurality of applications to provide a common service;
  a user analyzer which is implemented by the processor and which is configured to generate recommendation information of multimedia content based on the state information of the first application, the multimedia content including an application and digital content;
  a transmitter which is implemented by the processor and which is configured to push-transmit the recommendation information to the in-app module of the user terminal; and
  a downloader/streamer which is implemented by the processor and which is configured to download the multimedia content and to stream the downloaded multimedia content in response to a user request,
  wherein the user analyzer is further configured to:
    receive a present request relating to transmitting a particular application to a counterpart terminal,
    determine whether the particular application is executable in the counterpart terminal,
    when a determination is made that the particular application is not executable in the counterpart terminal, transmit, to the user terminal, a support unavailability notification message, and
    when a determination is made that the particular application is executable in the counterpart terminal, transmit, to the counterpart terminal, the particular application.

2. The in-app recommending system of claim 1, further comprising:
  a purchase history manager configured to manage multimedia content purchase histories of subscribers,
  wherein the user analyzer generates the recommendation information in consideration of a purchase history of a subscriber of the user terminal.

3. The in-app recommending system of claim 2, further comprising
  a terminal manager configured to manage a terminal list including a list of terminals owned by the subscribers, and search terminal information of the subscriber of the user terminal,
  wherein the user analyzer selects a subscriber preference terminal based on the purchase history in the terminal list of the subscriber of the user terminal, and generates recommendation information available to be used by the subscriber preference terminal.

4. The in-app recommending system of claim 1, wherein user analyzer is further configured to push-transmit a recommendation message to the user terminal, wherein the recommendation message includes an experience version download item for downloading and using multimedia content free of charge and a paid version download item for purchasing and using the multimedia content, and
  when the user selects the experience version download item and a confirmation request is received, the multimedia content includes experience version multimedia content, and when the user selects the paid version download item, a confirmation request is received, and purchasing of the multimedia content is completed, the user analyzer transmits the multimedia content to the user terminal.

5. The in-app recommending system of claim 4, wherein the experience version multimedia content is multimedia content whose usage term is limited or includes a portion of the multimedia content.

6. The in-app recommending system of claim 4, wherein when a recommendation request is received from the in-app module of the user terminal, the user analyzer checks purchase history of the counterpart terminal as a recommendation target to determine whether a first application having the in-app module of the user terminal installed therein has been purchased, and if the first application has not been purchased, the user analyzer transmits a terminal selection user interface page including a terminal list of a subscriber of the counterpart terminal to the counterpart terminal and generates the first application as a recommendation application such that the first application is executed in a terminal selected by the counterpart subscriber.

7. The in-app recommending system of claim 4, wherein when a share request is received from the in-app module of the user terminal, the user analyzer checks terminal information and purchase history of the subscriber of the counterpart terminal as a share request target to determine whether a first application having the in-app module of the user terminal installed therein has been purchased, and if the first application has not been purchased, the user analyzer determines whether the first application is executable in the counterpart terminal, and when the first application is executable, the user analyzer push-transmits a message recommending an experience version of the first application to the counterpart terminal, and when approval of the experience version recommendation is received from the counterpart terminal, the user analyzer provides the experience version of the first application to the counterpart terminal.

8. The in-app recommending system of claim 4, further comprising
  a settler configured to, when confirmation of the paid version is received from the user terminal, check integrated payment resource information of the subscriber of the user terminal, to perform, when the integrated payment resource information exists, payment for recommendation multimedia content by using the integrated payment resource information, and to receive, when the integrated payment resource information does not exist, payment information, register the received payment information as the integrated payment resource information, and perform payment.

9. A system for identifying a counterpart terminal and delivering
  a particular application to the counterpart terminal, the system comprising:
  a user-interface (UI) server, wherein the UI server is configured to:
    provide a UI page to a user terminal, wherein the UI page indicates a first device of a different user and a second device of the different user, and
    receive a first selection of the first device from a user, wherein the user is associated with the user terminal; and an in-app recommending system, coupled to the UI server, the in-app recommending system comprising:
a processor;
an in-app module interworker which is implemented by the processor and which is configured to:
receive, from the UI server, the first selection, and
periodically collect state information of a first application having an in-app module, from the user terminal, wherein the in-app module is installed in the user terminal, the in-app module being an application in a form of a component which can be inserted into a plurality of applications to provide a common service;
a user analyzer which is implemented by the processor and which is configured to generate recommendation information of multimedia content based on the state information of the first application, the multimedia content including an application and digital content; and
a downloader/streamer which is implemented by the processor and which is configured to download the multimedia content and to stream the downloaded multimedia content in response to a user request,
wherein the user analyzer is further configured to:
receive a present request relating to transmitting a particular application to a counterpart terminal,
determine whether the particular application is executable in the counterpart terminal,
when a determination is made that the particular application is not executable in the counterpart terminal, transmit, to the user terminal, a support unavailability notification message, and
when a determination is made that the particular application is executable in the counterpart terminal, transmit, to the counterpart terminal, the particular application.

* * * * *